(12) United States Patent
Yi et al.

(10) Patent No.: US 8,810,624 B2
(45) Date of Patent: Aug. 19, 2014

(54) APPARATUS AND METHOD FOR CONFIGURING SCREEN FOR VIDEO CALL USING FACIAL EXPRESSION

(75) Inventors: Ji-Young Yi, Seoul (KR); Sung-Dae Cho, Gyeonggi-do (KR); Kee-Hyon Park, Gyeonggi-do (KR); Jong-Man Kim, Gyeonggi-do (KR); Jin-Ho Kim, Seoul (KR); Chul-Hwan Lee, Seoul (KR); Dong-Hoon Jang, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 385 days.

(21) Appl. No.: 13/293,720

(22) Filed: Nov. 10, 2011

(65) Prior Publication Data

US 2012/0113211 A1    May 10, 2012

(30) Foreign Application Priority Data

Nov. 10, 2010    (KR) .......................... 10-2010-0111791

(51) Int. Cl.
*H04N 7/14*    (2006.01)
(52) U.S. Cl.
CPC ...................................... *H04N 7/14* (2013.01)
USPC .................................. 348/14.01; 379/142.01
(58) Field of Classification Search
USPC ............................ 348/14.01–14.1; 379/142.01
See application file for complete search history.

(56) References Cited

U.S. PATENT DOCUMENTS

| 8,098,273 | B2 * | 1/2012 | Khouri et al. ................ 348/14.1 |
| 2006/0037045 | A1 | 2/2006 | Hsieh | |
| 2014/0002573 | A1 * | 1/2014 | Kim et al. .................. 348/14.01 |

FOREIGN PATENT DOCUMENTS

| JP | 2005293061 | 10/2005 |
| JP | 2006285715 | 10/2006 |
| KR | 1020070025270 | 3/2007 |

* cited by examiner

*Primary Examiner* — Mohammad Islam
(74) *Attorney, Agent, or Firm* — The Farrell Law Firm, P.C.

(57) ABSTRACT

Apparatus and method for configuring a screen for a video call using a facial expression by recognizing a face from an image, calculating facial expression information for an expression of the recognized face, and determining whether there is a change in expression of the recognized face by comparing the calculated facial expression information with reference expression information preset to determine a change in expression of the face. If there is a change in expression of the recognized face, the apparatus and method selects a video image corresponding to the changed expression in the video call screen, and reconfigures the video call screen using the selected video image, making it possible for a user to conveniently select an image of the interested person without taking extensive action, and preventing a wrong image from being selected due to the unintended user facial movement.

14 Claims, 5 Drawing Sheets

APPARATUS AND METHOD FOR CONFIGURING SCREEN FOR VIDEO CALL USING FACIAL EXPRESSION

PRIORITY

This application claims priority under 35 U.S.C. §119(a) to a Korean Patent Application filed in the Korean Intellectual Property Office on Nov. 10, 2010 and assigned Serial No. 10-2010-0111791, the entire disclosure of which is incorporated herein by reference.

BACKGROUND OF THE INVENTION

1. Field of the Invention

The present invention relates generally to a screen configuring apparatus and method, and more particularly, to an apparatus and method for configuring a screen for a video call by selecting an image of an interested user among multiple users.

2. Description of the Related Art

In a video call, a picture of a caller is taken using a camera, displayed on a screen, and images of the persons with whom the caller wants to have a telephone conversation are displayed in a specific location of the screen, for a video call.

A multipoint video call (or video conference call) technique, which allows a user to have a video call with multiple persons on a mobile terminal, automatically identifies a speaking party by lip movement recognition, and displays an image of the speaker at the center of the screen, making it possible to talk with multiple persons.

In a multipoint video call apparatus, a display includes a main screen having the largest area on a video call screen, and at least one sub screen.

However, the conventional multipoint video call technique may malfunction when several users move their lips at the same time.

Additionally, it is difficult for a user to select an image of another user other than the speaker, when a user has an interest in having a conversation with the other user.

SUMMARY OF THE INVENTION

Accordingly, the present invention has been made to solve the above-mentioned problems occurring in the prior art, and the present invention provides a video call apparatus and method for estimating a facial expression during a video call with multiple users, selecting an image of an interested person, and allowing a user to have a video call with the selected interested person.

According to one aspect of the present invention, there is provided an apparatus for configuring a screen for a video call using a facial expression which includes a facial expression information calculator for recognizing a face from an image, and calculating facial expression information for an expression of the recognized face; a facial expression determiner for determining whether there is a change in expression of the recognized face by comparing the calculated facial expression information with reference expression information preset to determine a change in expression of the face; a screen configurer for configuring a video call screen including multiple video images received for the video call; and an image selector for selecting a video image corresponding to the changed expression in the video call screen if there is a change in expression. The screen configurer may reconfigure the video call screen using the selected video image.

According to another aspect of the present invention, there is provided a method for configuring a screen for a video call using a facial expression by configuring a video call screen including multiple video images received for the video call; recognizing a face from an image, and calculating facial expression information for an expression of the recognized face; determining whether there is a change in expression of the recognized face by comparing the calculated facial expression information with reference expression information preset to determine a change in expression of the face; selecting a video image corresponding to the changed expression in the video call screen if there is a change in expression; and reconfiguring the video call screen using the selected video image.

BRIEF DESCRIPTION OF THE DRAWINGS

The above and other aspects, features and advantages of various embodiments of the present invention will be more apparent from the following description taken in conjunction with the accompanying drawings, in which.

Throughout the drawings, the same drawing reference numerals will be used to refer to the same elements, features and structures.

DETAILED DESCRIPTION OF EMBODIMENTS OF THE PRESENT INVENTION

Various embodiments of the present invention will be described in detail with reference to the accompanying drawings. In the following description, specific details such as detailed configuration and components are merely provided to assist the overall understanding of various embodiments of the present invention. Therefore, it will be apparent to a person having ordinary skill in the art of the present invention that various changes and modifications of the embodiments described herein can be made without departing from the scope and spirit of the invention. In addition, descriptions of well-known functions and constructions are omitted for clarity and conciseness.

Figure 1:
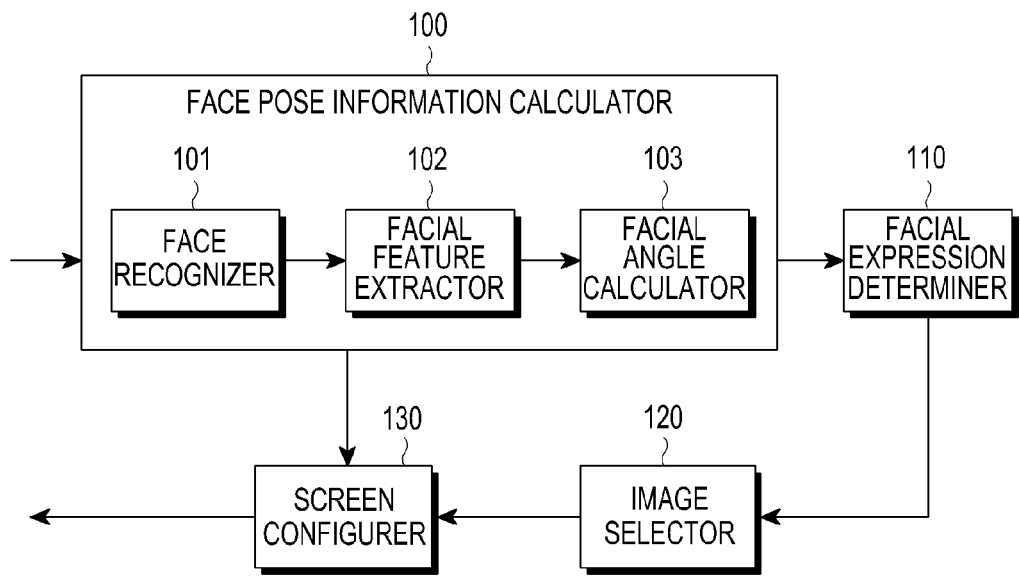
FIG. 1 is a diagram illustrating a structure of a screen configuring apparatus according to an embodiment of the present invention.

FIG. 1 is a diagram illustrating a structure of a screen configuring apparatus according to an embodiment of the present invention.

Referring to FIG. 1, the screen configuring apparatus includes a facial expression information calculator 100, a facial expression determiner 110, an image selector 120, and a screen configurer 130.

The facial expression information calculator 100 calculates facial expression information within a frame of an input image received from a camera during a video call, or of input images received outside the video call.

The facial expression information calculator 100 presets reference expression information that is used to determine changes in facial expression during a video call from an input image received from the camera before the video call.

The facial expression information calculator 100 includes a face recognizer 101, a facial feature extractor 102, and a face angle calculator 103.

The face recognizer 101 uses a general face recognition technique in recognizing a face area in an input image, for example, recognizing an area corresponding to a preset facial skin color in an input image, as a face area.

The facial feature extractor 102 extracts facial features in the recognized face area. For the extraction of the facial features, a general facial feature extraction technique is used. The facial features as used herein may refer to facial feature components such as eyes, nose, mouth and chin.

The face angle calculator 103 calculates a reference face angle based on the extracted facial features. Specifically, the face angle calculator 103 draws polygonal sides by connecting the calculated facial features, and calculates an angle of the recognized face based on the drawn polygonal sides. For the calculation of the face angle, a general face angle calculation technique is used.

When a video call begins, the screen configurer 130 configures a video call screen for the video call, using at least one input image received during the video call and a user image received from a camera. The at least one input image is defined as at least one sub image, and the user image received from a camera is defined as a main image.

That is, the face configurer 130 displays a main image in an area with a preset size on the video call screen, and displays at least one sub image in the remaining area except for the area where the main image is displayed. The screen configurer 130 sets a size of the area where the main image is displayed on the video call screen, to be greater than a size of the area where the at least one sub image is displayed.

The facial expression determiner 110 determines whether there is a change in facial expression by comparing facial expression information in the main image, calculated by the facial expression information calculator 100 during a video call, with preset reference expression information.

Specifically, the facial expression determiner 110 determines whether there is a change in face angle by comparing the face angle in the main image calculated by the face angle calculator 103 with a preset reference face angle.

If there is a change in facial expression information, the image selector 120 selects a sub image corresponding to the changed facial expression from among multiple sub images located on the video call screen.

That is, if a difference between the calculated face angle in the main image and the preset reference face angle is greater than or equal to a preset value, the image selector 120 estimates a face direction corresponding to the face angle in the main image, and selects a sub image corresponding to the estimated face direction in a face area of the main image on the video call screen.

If a change in facial expression is continuously recognized for a preset time, the screen configurer 130 reconfigures a video call screen corresponding to the changed facial expression using the sub image selected by the image selector 120, and displays the reconfigured video call screen.

Specifically, if the face direction estimated by the image selector 120 is continuously recognized for a preset time, the screen configurer 130 switches between a screen of the main image and a screen of the selected sub image on the video call screen.

As such, the screen configuring apparatus estimates a facial expression of a user and selects an image of an interested person on the video call screen, making it possible for the user to conveniently select an image of the interested person without taking extensive action.

Figure 2:
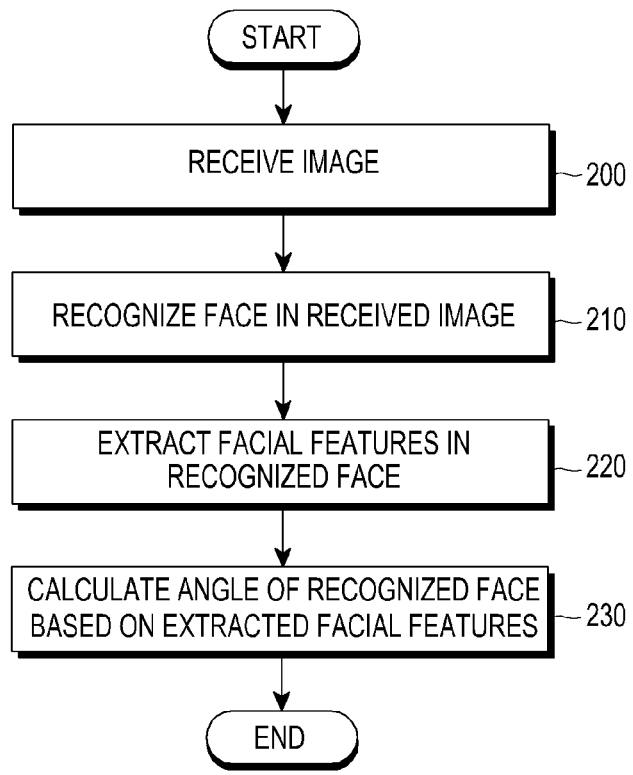
FIG. 2 is a flowchart illustrating a process of extracting reference expression information used to estimate changes in facial expression in a screen configuring apparatus according to an embodiment of the present invention.

FIG. 2 is a diagram illustrating a process of setting reference expression information in a screen configuring apparatus according to an embodiment of the present invention.

Figure 3:
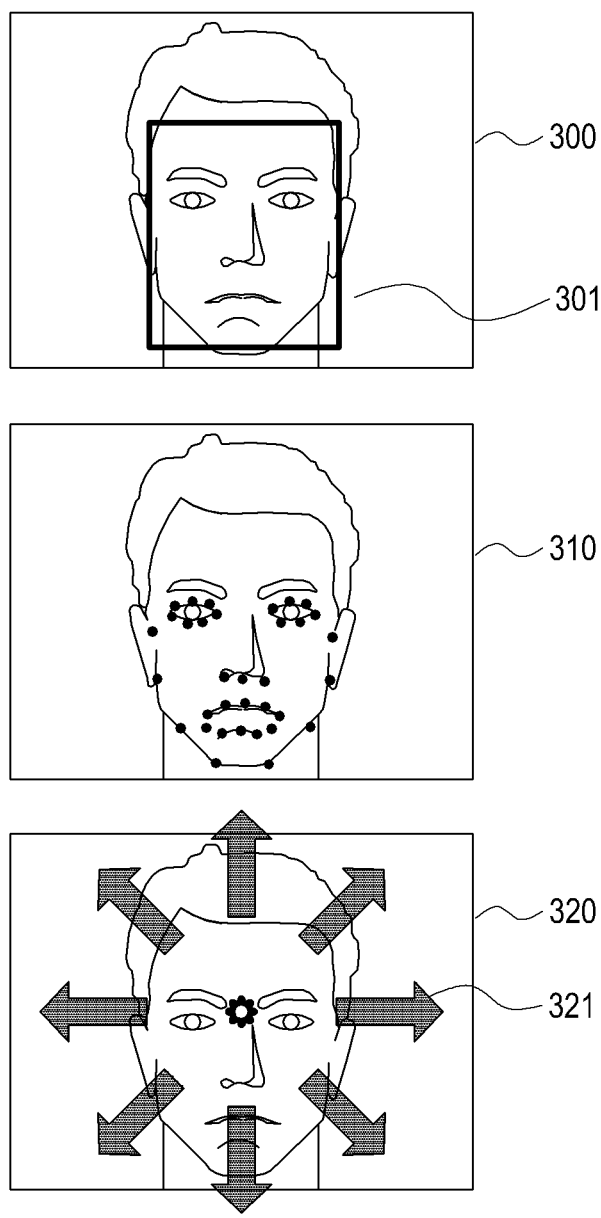
FIG. 3 is a diagram illustrating images obtained in a process of extracting reference expression information according to an embodiment of the present invention.

Referring to FIG. 2, upon receiving an image from a camera in step 200, the facial expression information calculator 100 recognizes a face in the received image in step 210. As described above, for the recognition of a face in an image, a general face recognition technique is used, and a technique of learning a skin color and recognizing an area corresponding to the learned skin color as a face area may also be used. For example, with reference to FIG. 3, the facial expression information calculator 100 recognizes a face area 301 in an input image 300.

In step 220, the facial expression information calculator 100 extracts facial features in the recognized face. As represented by reference numeral 310, the facial expression information calculator 100 extracts facial features at the locations corresponding to eyes, nose, mouth and chin in the face area.

In step 230, the facial expression information calculator 100 calculates a face angle of the recognized face based on the extracted facial features. For example, the facial expression information calculator 100 calculates a face angle 321 in an image 320 using an area of a polygon by connecting the facial features, and then ends setting the reference expression information.

As such, the screen configuring apparatus may recognize changes in facial expression in an image received during a video call and reconfigure a video call screen corresponding to the changed facial expression.

Figure 4:
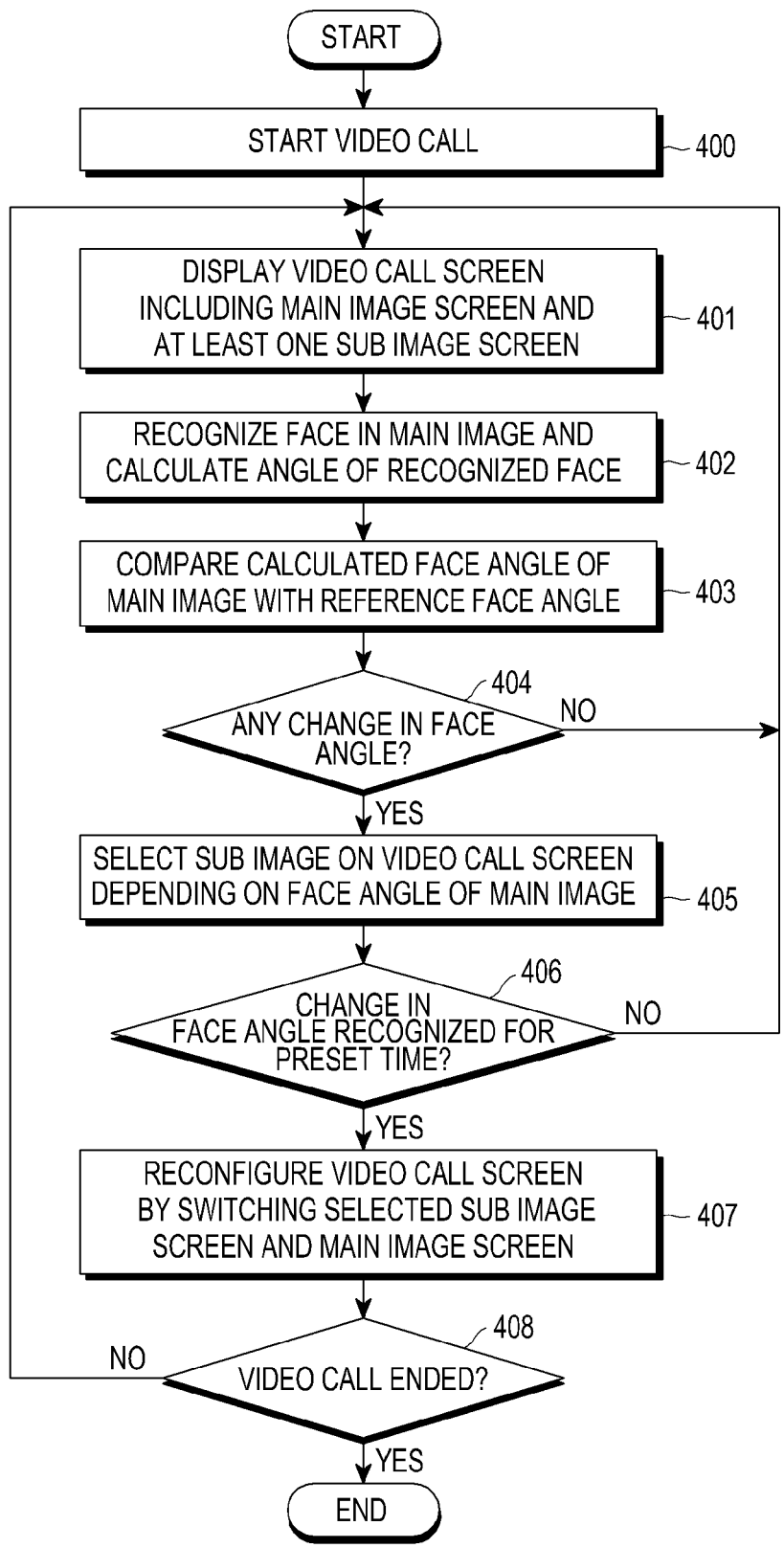
FIG. 4 is a flowchart illustrating a process of reconfiguring a video call screen corresponding to changes in facial expression during a video call in a screen configuring apparatus according to an embodiment of the present invention.

FIG. 4 is a diagram illustrating a process of reconfiguring a video call screen corresponding to changes in facial expression during a video call in a screen configuring apparatus according to an embodiment of the present invention.

According to an embodiment of the present invention, a user image received from a camera is defined as a main image, and at least one input image received from outside is defined as at least one sub image. An embodiment of the present invention will be described with reference to FIGS. 5 to 7.

Figure 5:
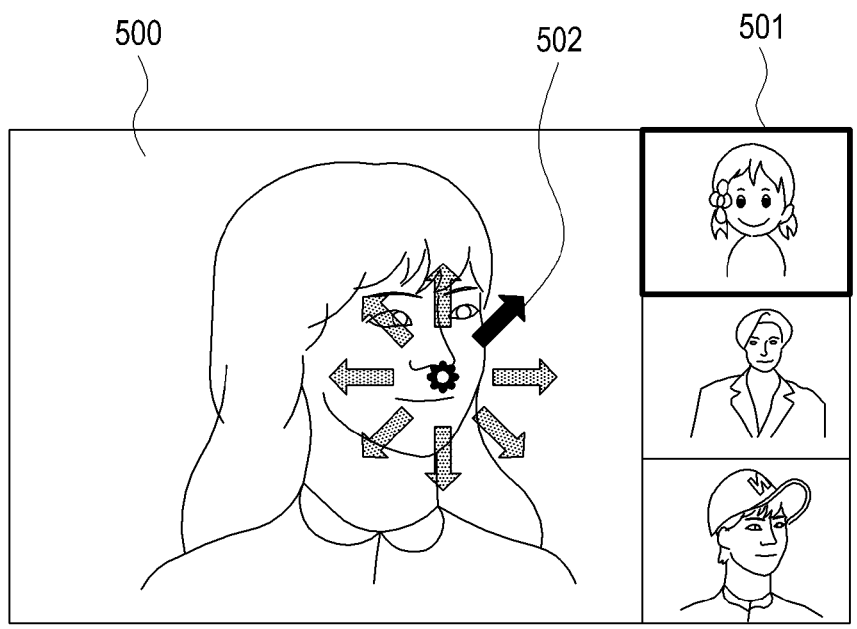
FIGS. 5 to 7 are diagrams illustrating images obtained in a process of configuring a video call screen according to an embodiment of the present invention.
Figure 6:
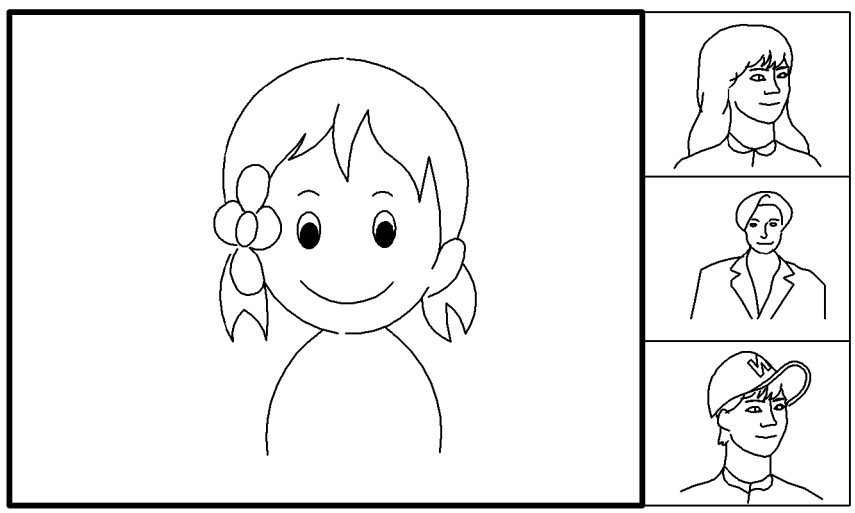
Figure 7:
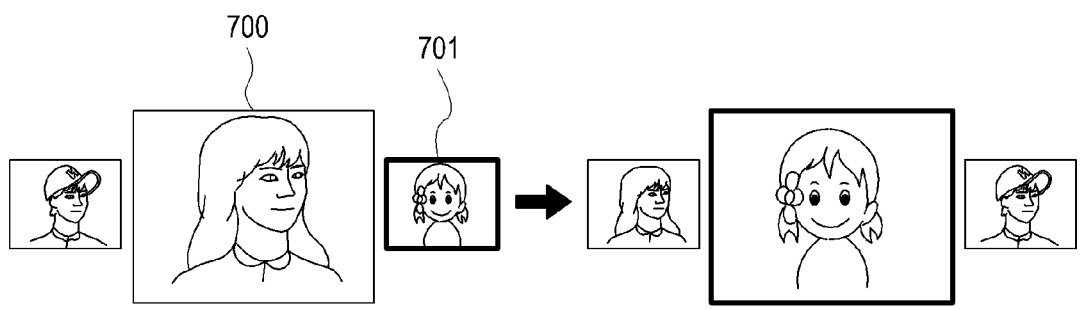

FIGS. 5 to 7 are diagrams illustrating images obtained in a process of configuring a video call screen according to an embodiment of the present invention.

Referring to FIG. 4, if a video call begins in step 400, the screen configurer 130 configures and displays a video call screen including a screen of a main image and a screen of at least one sub image in step 401.

The screen configurer 130 displays a main image in an area with a preset size on the video call screen, and displays at least one sub image in the remaining area except for the area where the main image is displayed. The screen configurer 130 sets a size of the area where the main image is displayed on the video call screen, to be greater than a size of the area where the at least one sub image is displayed.

The displayed video call screen may be as illustrated in FIG. 5.

In step 402, the facial expression information calculator 100 recognizes a face in the main image, calculates facial features of the recognized face, and calculates a face angle based on the calculated facial features.

Specifically, the face recognizer 101 recognizes a face area in the main image using the general face recognition technique, for example, by recognizing an area corresponding to a preset facial skin color in an input image, as a face area.

Thereafter, the facial feature extractor 102 extracts facial features in the recognized face area, and the face angle calculator 103 calculates a reference face angle based on the extracted facial features.

In step 403, the facial expression determiner 110 compares the face angle in the main image calculated by the facial expression information calculator 100, with a preset reference face angle.

In step 404, the facial expression determiner 110 determines whether there is a change in face angle. If there is a change in face angle, the image selector 120 proceeds to step 405. Otherwise, the screen configurer 130 continuously displays the video call screen in step 401.

In step 405, the image selector 120 selects a sub image that is located on the video call screen to correspond to the face angle of the main image.

That is, if a difference between the calculated face angle in the main image and the preset reference face angle is greater than or equal to a preset value, the image selector 120 estimates a face direction corresponding to the face angle in the main image, and selects a sub image corresponding to the estimated face direction in a face area of the main image on the video call screen.

Referring to FIGS. 5 and 6, the image selector 120 estimates a face direction 502 corresponding to a face angle of a main image 500, and selects a sub image 501 corresponding to the estimated face direction 502 in the face area.

As illustrated in FIG. 5, the screen configurer 130 may further display, on the video call screen, face direction arrow icons for allowing the user to recognize face directions corresponding to face angles. These face direction arrow icons may be displayed to overlap the screen of the main image.

To emphasize that the selected sub image is a selected image, the screen configurer 130 may display the edge of the selected sub image to be bold, or may display the selected sub image to be greater in size than other sub images.

In step 406, the screen configurer 130 determines whether a change in face angle is continuously recognized for a preset time. If the change in face angle is continuously recognized, the screen configurer 130 proceeds to step 407. Otherwise, the screen configurer 130 continuously displays the video call screen in step 401.

The reason why the screen configurer 130 determines whether a change in face angle continues for a preset time is to prevent a wrong sub image from being selected due to the unintended user facial movement.

In step 407, the screen configurer 130 reconfigures a video call screen corresponding to the changed facial expression using the sub image selected by the image selector 120, and displays the reconfigured video call screen. For example, as illustrated in FIG. 6, the screen configurer 130 reconfigures the video call screen such that the screen of the main image and the screen of the selected sub image are switched in terms of the location, thereby displaying the selected sub image in the area of the main image.

As illustrated in FIG. 7, the screen configurer 130 may to place the screen of the sub image in the area of the main image by switching between a screen 700 of the main image and a screen 701 of the sub image on the video call screen.

In step 408, the screen configurer 130 determines if the video call has been completed. If the video call has been completed, the screen configurer 130 ends the video call operation. Otherwise, the screen configurer 130 returns to step 401 and repeats its succeeding steps.

According to embodiments of the present invention, the user's facial expression is estimated and an image of the user's interested person on the video call screen is selected, thereby allowing the user to conveniently select an image of the interested person without taking extensive action. The embodiments of the present invention may set a time margin for selecting an image of an interested person, to prevent a wrong image from being selected due to unintended user facial movement.

In addition, the embodiments of the present invention provide accurate, intuitive and convenient functions according to the display screen of the video call apparatus, thereby increasing user convenience.

While the invention has been shown and described with reference to various embodiments thereof, it will be understood by those skilled in the art that various changes in form and detail may be made therein without departing from the spirit and scope of the invention as defined by the appended claims.

What is claimed is:

1. An apparatus for configuring a screen for a video call using a facial expression, comprising:
    a facial expression information calculator for recognizing a face from an image, and calculating facial expression information for an expression of the recognized face;
    a facial expression determiner for determining whether there is a change in expression of the recognized face by comparing the calculated facial expression information with reference expression information preset to determine a change in expression of the face;
    a screen configurer for configuring a video call screen including multiple video images received for the video call; and
    an image selector for selecting a video image corresponding to the changed expression in the video call screen if there is a change in expression,
    wherein the screen configurer reconfigures the video call screen using the selected video image.

2. The apparatus of claim 1, wherein the video call screen includes a screen of a main image received from a camera and a screen of at least one sub image received outside of the video call.

3. The apparatus of claim 2, wherein the facial expression information calculator recognizes a face in the main image, extracts facial features of the recognized face, and calculates a face angle of the recognized face based on the extracted facial features.

4. The apparatus of claim 3, wherein the facial expression information calculator calculates a face angle from an image received before the video call, and sets the calculated face angle as a reference face angle.

5. The apparatus of claim 4, wherein the facial expression determiner determines whether a difference between the calculated face angle and the reference face angle is greater than or equal to a preset threshold by comparing the calculated face angle with the reference face angle.

6. The apparatus of claim 5, wherein the image selector estimates a face direction corresponding to the calculated face angle if the difference between the calculated face angle and the reference face angle is greater than or equal to the threshold and selects a sub image corresponding to the estimated face direction in a face area of the main image on the video call screen.

7. The apparatus of claim 6, wherein the screen configurer reconfigures the video call screen by switching between the screen of the main image and the screen of the selected sub image on the video call screen.

8. A method for configuring a screen for a video call using a facial expression, comprising:
configuring a video call screen including multiple video images received for the video call;
recognizing a face from an image, and calculating facial expression information for an expression of the recognized face;
determining whether there is a change in expression of the recognized face by comparing the calculated facial expression information with reference expression information preset to determine a change in expression of the face;
selecting a video image corresponding to the changed expression in the video call screen if there is a change in expression; and
reconfiguring the video call screen using the selected video image.

9. The method of claim 8, wherein the video call screen includes a screen of a main image received from a camera and a screen of at least one sub image received outside of the video call.

10. The method of claim 9, wherein calculating facial expression information further comprises:
recognizing a face in the main image;
extracting facial features of the recognized face; and
calculating a face angle of the recognized face based on the extracted facial features.

11. The method of claim 10, further comprising calculating a face angle from an image received before the video call, and setting the calculated face angle as a reference face angle.

12. The method of claim 11, wherein determining whether there is a change in expression of the recognized face further comprises determining whether a difference between the calculated face angle and the reference face angle is greater than or equal to a preset threshold by comparing the calculated face angle with the reference face angle.

13. The method of claim 12, wherein selecting a video image corresponding to the changed expression comprises:
estimating a face direction corresponding to the calculated face angle if the difference between the calculated face angle and the reference face angle is the threshold value or above; and
selecting a sub image corresponding to the estimated face direction in a face area of the main image on the video call screen.

14. The method of claim 13, wherein reconfiguring the video call screen comprises switching between the screen of the main image and the screen of the selected sub image on the video call screen.

* * * * *